US011862999B2

(12) United States Patent
Ling et al.

(10) Patent No.: US 11,862,999 B2
(45) Date of Patent: Jan. 2, 2024

(54) ONLINE RECONFIGURABLE BATTERY SYSTEM WITH CURRENT SURGE PROTECTION MODULES AND ACTIVATION METHOD THEREOF

(71) Applicant: FORTUNE ELECTRIC CO., LTD., Taoyuan (TW)

(72) Inventors: Shou-Hung Welkin Ling, Taoyuan (TW); Jui-Yang Tsai, Taoyuan (TW); Jason S. Lin, Taoyuan (TW); I-Sheng Hsu, Taoyuan (TW)

(73) Assignee: FORTUNE ELECTRIC CO., LTD., Taoyuan (TW)

( * ) Notice: Subject to any disclaimer, the term of this patent is extended or adjusted under 35 U.S.C. 154(b) by 408 days.

(21) Appl. No.: 17/391,926

(22) Filed: Aug. 2, 2021

(65) Prior Publication Data
US 2022/0368137 A1    Nov. 17, 2022

(30) Foreign Application Priority Data
May 17, 2021  (TW) .................................. 110117781

(51) Int. Cl.
*H02J 7/16*    (2006.01)
*H02J 7/00*    (2006.01)

(52) U.S. Cl.
CPC .......... *H02J 7/0016* (2013.01); *H02J 7/0019* (2013.01); *H02J 7/0068* (2013.01)

(58) Field of Classification Search
CPC ....... H02J 7/0016; H02J 7/0068; H02J 7/0019
USPC ................. 320/164, 118, 121, 122, 134, 136
See application file for complete search history.

(56) References Cited

U.S. PATENT DOCUMENTS

| 6,741,437 | B2 * | 5/2004 | Vanhee | ............... | H02J 7/00309 |
| | | | | | 361/57 |
| 10,027,223 | B1 * | 7/2018 | Zhang | ..................... | H02M 3/07 |

FOREIGN PATENT DOCUMENTS

| CN | 111600468 A | * | 8/2020 | | |
| DE | 102018004659 A1 | * | 12/2018 | ............... | H02M 1/36 |
| EP | 1111751 A1 | * | 6/2001 | ............ | H02J 7/0016 |
| WO | WO-2010089338 A2 | * | 8/2010 | ............. | H02H 3/025 |
| WO | WO-2018096341 A1 | * | 5/2018 | .............. | B60L 58/19 |

* cited by examiner

*Primary Examiner* — Phallaka Kik
(74) *Attorney, Agent, or Firm* — Lin & Associates Intellectual Property, Inc.

(57) ABSTRACT

An online reconfigurable battery system with current surge protection modules (SPM), including: a plurality of battery module strings connected in parallel. The battery module string further includes: an SPM and a plurality of enable/bypass battery modules (EBM) connected in series; where the EBM further includes: a battery, a first switch, and a second switch; the first switch and the battery are connected in series, and then connected to the second switch in parallel to form an EBM that can be enabled or bypassed; the SPM further includes: a variable resistor, a third switch, and a fourth switch; the third switch and the variable resistors are connected in series, and then connected in parallel with the fourth switch to buffer the surge current.

10 Claims, 5 Drawing Sheets

ONLINE RECONFIGURABLE BATTERY SYSTEM WITH CURRENT SURGE PROTECTION MODULES AND ACTIVATION METHOD THEREOF

CROSS-REFERENCE TO RELATED APPLICATION

This application claims the priority of Taiwanese patent application No. 110117781, filed on May 17, 2021, which is incorporated herewith by reference.

BACKGROUND OF THE INVENTION

1. Field of the Invention

The present invention relates generally to an online reconfigurable battery system with current surge protection modules and activation method thereof.

2. The Prior Arts

One of the most common damages in the conventional power supply system is from surge currents generated when power is turned on. The so-called surge current refers to the maximum instantaneous input current that an electrical device will absorb when power is turned on. Generally, AC motors and transformers may absorb several times the normal full-load current at the moment when just powered on, and continue for several input waveform cycles. Due to the charging current of the input capacitor, the surge current of the power converter is usually much higher than its steady-state current. When it is necessary to withstand high surge currents, the selection of overcurrent protection devices such as fuses and circuit breakers will become more complicated. Over-current protection must respond quickly to overload or short-circuit faults, and must not interrupt the circuit when surge current flows.

U.S. patent Ser. No. 10/063,067 disclosed a battery system and control method thereof. The battery system provides the ability to be reconfigured in real time. The battery system includes a plurality of battery modules. During the mode switching transition period, each battery module has a constant output current. The battery module separately monitors the status of each battery in the battery module. The main control module dynamically controls the voltage conversion operation mode of the voltage converter of the battery system according to the load demand, the battery status and the conversion efficiency of the battery module, and dynamically controls the operation mode of the battery module. In other words, the battery system can trigger reconfiguration due to the imbalance of the system load demand and send out a reconfiguration signal; on the other hand, the performance of the battery system can also be maintained through regular reconfiguration.

In the reconfiguration process of the reconfigurable battery system as described above, due to the voltage imbalance between the battery strings and between the battery array and the load, surge currents often appear in the battery strings during the reconfiguration transition period. Such surge current will cause component attenuation and reduce system reliability by triggering system failure/protection.

In view of the above, how to add an appropriate surge protection module (SPM) in the above-mentioned reconfigurable battery system to protect each battery module in the reconfigurable battery system from impacted by the surge current and configuring a corresponding starting method to increase the stability of the reconfigurable battery system and expand the application range is the objective of the present invention.

SUMMARY OF THE INVENTION

A primary objective of the present invention is to provide a battery system with SPM that can be reconfigured in real time, which can smooth the surge current when the battery system is started or reset, so as to avoid the impact on the battery modules and battery module string to prevent short-circuited and damaged.

Another objective of the present invention is to provide a battery system with SPM that can be reconfigured in real time, which can reduce the generation of heat energy and achieve the effect of energy saving by smoothing and reducing transient current changes.

Yet another objective of the present invention is to provide a battery system with SPM that can be reconfigured in real time, which can reduce the surge current effect when the battery system uses a non-homogeneous battery module, and increase the performance and stability of the battery system.

Another objective of the present invention is to provide an activation method for a battery system with SPM that can be reconfigured in real time. In cooperation with the SPM of the battery system, the present invention can improve the safety of the battery system by buffering or intercepting the surge current of the battery module strings during overcurrent, or improve the usability of the battery system by cutting off a part of the battery module strings for maintenance.

To achieve the above objectives, an embodiment of the present invention provides an online reconfigurable battery system with surge protection modules, comprising: a plurality of battery module strings connected in parallel, each battery module string further comprising: a surge protection module (SPM), and a plurality of enable/bypass modules (EBM) connected in series, the plurality of enable/bypass modules connected in series are serially connected to the SPM; wherein, the EBM further comprising: a battery, a first switch, and a second switch; the first switch and the battery module being connected in series, and then connected in parallel with the second switch to form a battery module with enable or bypass function; the SPM further comprising: a variable resistor, a third switch, and a fourth switch; the third switch and the variable resistor being connected in series, and then connected in parallel with the fourth switch to control the buffering of the surge current.

In a preferred embodiment, the EBM operates in three modes: enable mode, bypass mode, and disable mode; when the first switch is on and the second switch is off, the EBM is in the enable mode, and the battery is in an on state; when the first switch is off and the second switch is on, the EBM is in the bypass mode, and the battery is in an off state; when the first switch is off and the second switch is off, the EBM is in the disable mode, and the EBM is in a disconnected state.

In a preferred embodiment, the SPM operate in three modes: resistor mode, connect mode, and disconnect mode; when the third switch is on and the fourth switch is off, the SPM is in the resistor mode, and the current of the SPM will flow through the variable resistor; when the third switch is off and the four switch is on, the SPM is in the connect mode, and the current of the SPM does not flow through the variable resistor; when the third switch is off and the fourth switch is off, the SPM is in the disconnect mode, and no current flows through the SPM.

In a preferred embodiment, when the third switch and the fourth switch of the SPM are on at the same time, the SPM is also in the connect mode.

An embodiment of the present invention provides an activation method with SMP, and the activation method comprises the following steps:

Step S501: Start the battery system and perform initialization;
Step S502: Check each SPM; if a fault is detected in the SPM, go to step S503; otherwise, go to step S505;
Step S503: Set the old setting (old_GPIO) of the SPM to the third switch and the fourth switch to be off (L, L) at the same time;
Step S504: The SPM enters the disconnect mode until a reset command is received; when the reset command is received, return to step S502;
Step S505: Read a new setting (new_GPIO) command;
Step S506: If the new setting is (H, H) or (L, L), perform step S507;
Step S507: Store the new setting (new_GPIO) into the old setting (old_GPIO); then return to step S504;
Step S508: If the new setting (new_GPIO) is different from the old setting (old_GPIO), go to step S509; otherwise, go to step S512;
Step S509: The new setting (new_GPIO) is stored in the old setting (old_GPIO); the SPM enters the resistor mode, and then gradually fades out of the resistor mode;
Step S510: if the current is higher than a threshold value, go to step S511;
otherwise, go to step S512;
Step S511: Set the old setting (old_GPIO) to (H, H); then return to step S504;
Step S512: The SPM enters the connection mode, and then waits until receiving a new setting command (new_GPIO) or detects an overcurrent condition, that is, surge current;
Step S513: If the surge current is detected, return to step S509; otherwise, return to step S505.

In a preferred embodiment, the fade-out of the resistor mode in step S509 means that the resistance value of the variable resistance Rv gradually decreases from a first resistance value to a second resistance value within a predetermined time.

In a preferred embodiment, the first resistance value and the second resistance value are both greater than the resistance value of the battery module string during connect mode.

In a preferred embodiment, the first resistance value and the second resistance value are respectively 20 ohm and 0.2 ohm.

In a preferred embodiment, the predetermined time is 50 ms.

In a preferred embodiment, the condition for SPM to enter the connect mode from the resistor mode is: in the resistor mode, when the current value is less than the threshold value (I threshold), the threshold value can be calculated by the following method: $I_{threshold} = I_{connect-max} * (R_{connect}/R_{R-mode})$, where $R_{connect}$ is the total resistance value of the battery module string in connect mode, and $R_{R-mode}$ is the resistance value of the variable resistor and $R_{connect}$ is the total resistance value of the battery module string in the connect mode, and $I_{connect-max}$ is the maximum allowable current value.

In a preferred embodiment, the current threshold is 300 A.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 1:
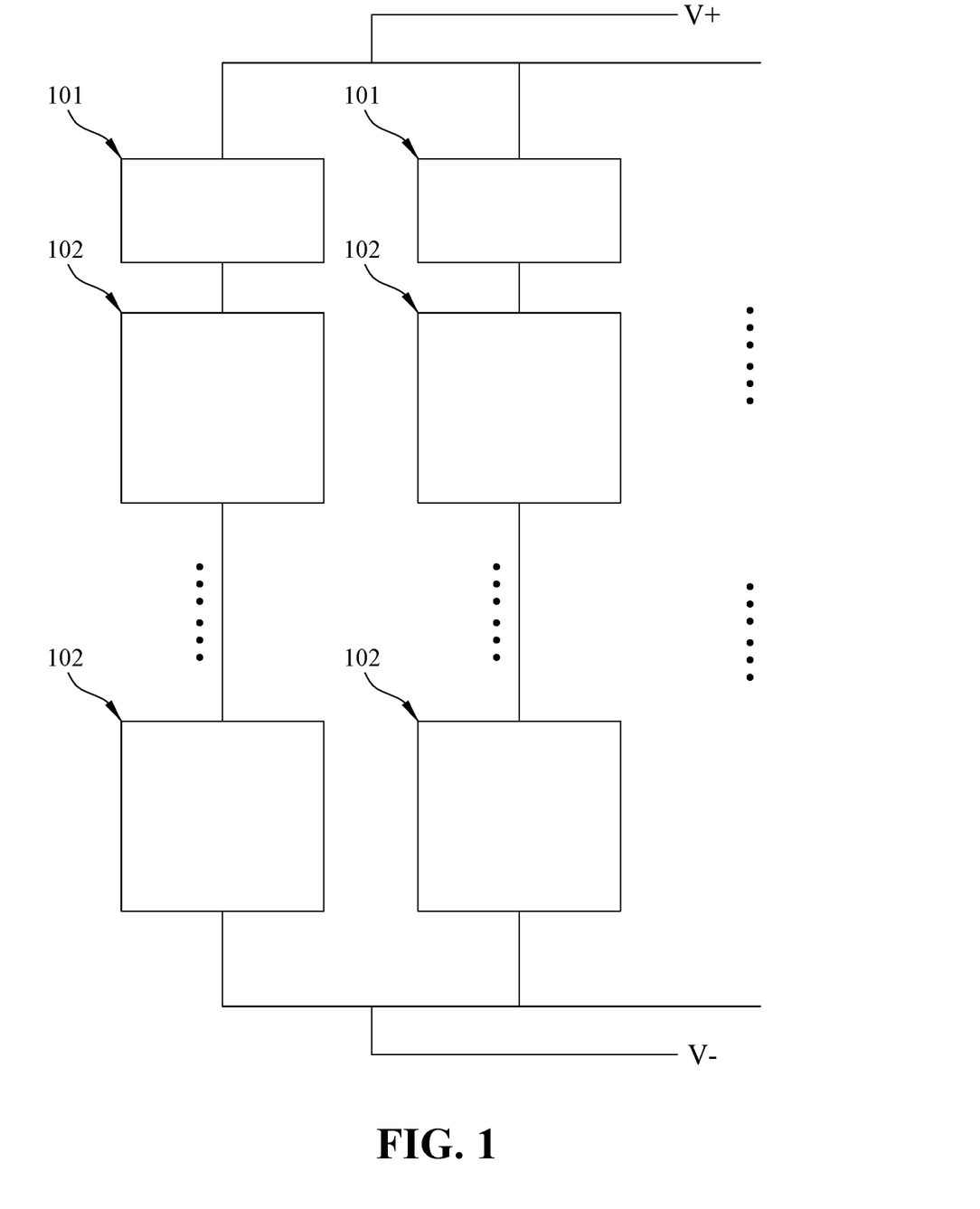
FIG. 1 is a structural schematic view of the online reconfigurable battery system with SPM according to the present invention.
Figure 2:
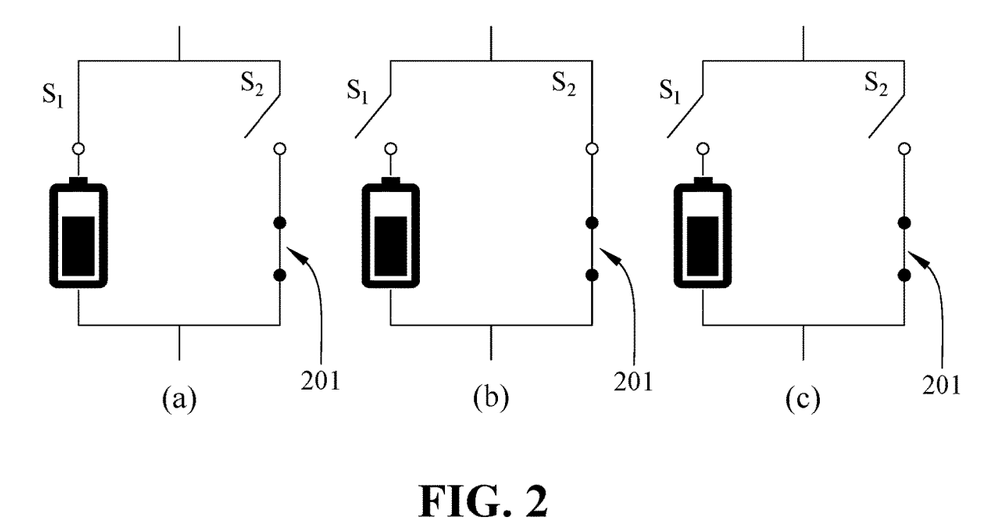
FIG. 2 is a schematic view of the operation modes of the EBM of the online reconfigurable battery system with SPM according to the present invention.
Figure 3:
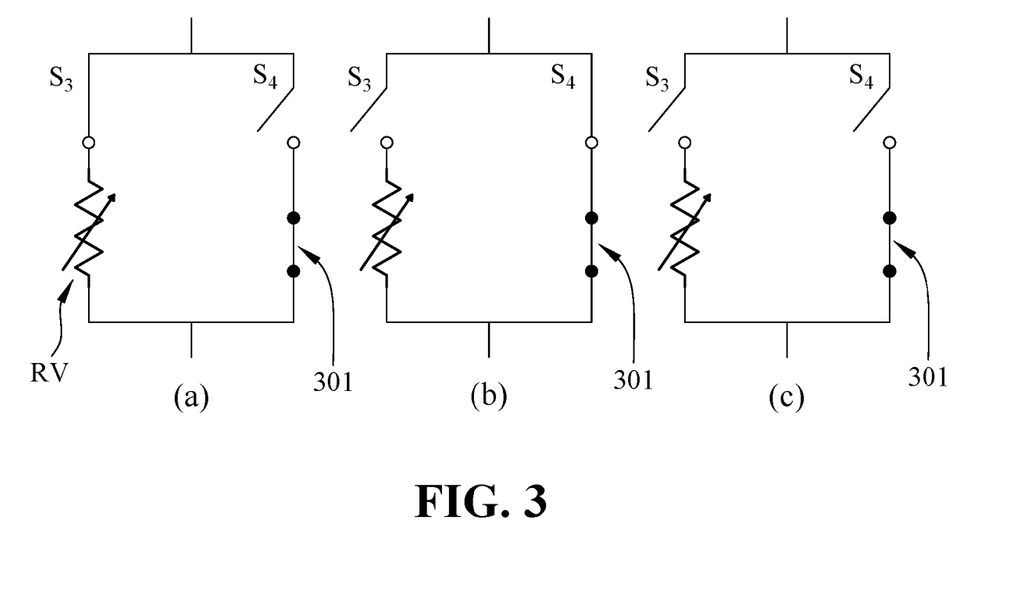
FIG. 3 is a schematic view of the operation modes of the SPM of the online reconfigurable battery system with SPM according to the present invention.

Referring to FIG. 1, FIG. 2, and FIG. 3, FIG. 1 is a structural schematic view of the online reconfigurable battery system with SPM according to the present invention; FIG. 2 is a schematic view of the operation modes of the EBM of the online reconfigurable battery system with SPM according to the present invention; FIG. 3 is a schematic view of the operation modes of the SPM of the online reconfigurable battery system with SPM according to the present invention.

As shown in FIGS. 1-3, the online reconfigurable battery system with SPM of the present invention includes: a plurality of battery module strings connected in parallel, each battery module string further comprising: a surge protection module (SPM) 101, and a plurality of enable/bypass modules (EBM) 102 connected in series, the plurality of enable/bypass modules 102 connected in series are serially connected to the SPM 101. Wherein, the EBM 102 further comprises: a battery, a first switch S1, and a second switch S2; the first switch S1 and the battery module are connected in series, and then connected in parallel with the second switch S2 to form a battery module with enable or bypass function. Moreover, the SPM 102 further comprises: a variable resistor Rv, a third switch S3, and a fourth switch S4; the third switch S3 and the variable resistor Rv are connected in series, and then connected in parallel with the fourth switch S4 to control the buffering of the surge current.

As shown in FIG. 2, the EBM 102 has three operation modes: (a) enable mode, (b) bypass mode, and (c) disable mode. Specifically, when the first switch S1 is on and the second switch S2 is off, the EBM 102 is in the enable mode, in other words, the battery is ON. When the first switch S1 is off and the second switch S2 is on, the EMB 102 is in the bypass mode. In other words, the battery is OFF and is not connected in series to the other battery modules of the battery system, and the current flows through a bypass path 201 connected in parallel with the battery. When the first switch S1 is off and the second switch S2 is off, the EBM 102 is in the disable mode, in other words, the entire EBM 102 is disconnected from the battery module string.

It is worth noting that in the bypass mode, the EBM 102 is still in series with the other EBMs 102 in the battery module string to which it belongs. The battery is bypassed. On the other hand, in the disable mode, the EBM does not maintain a serial connection with other EBMs 102 in the battery module string.

As shown in FIG. 3, the SPM 101 also has three operation modes: (a) resistor mode, (b) connect mode, and (c) disconnect mode. Specifically, when the third switch S3 is on and the fourth switch S4 is off, the SPM 101 is in the resistor mode, and the current of the SPM 101 will flow through the variable resistance Rv. When the third switch S3 is off and the fourth switch S4 is on, the SPM 101 is in the connect mode, and the current of the SPM 101 does not flow through the variable resistor Rv, instead, the current flows through the connection path 301 on the side. When the third switch S3 is off and the fourth switch S4 is off, the SPM 101 is in the disconnect mode, and no current flows through the SPM 101.

It is worth noting that, in a preferred embodiment, when the third switch S3 and the fourth switch S4 of the SPM 101 are on at the same time, the SPM 101 is also in the connect mode.

Figure 4:
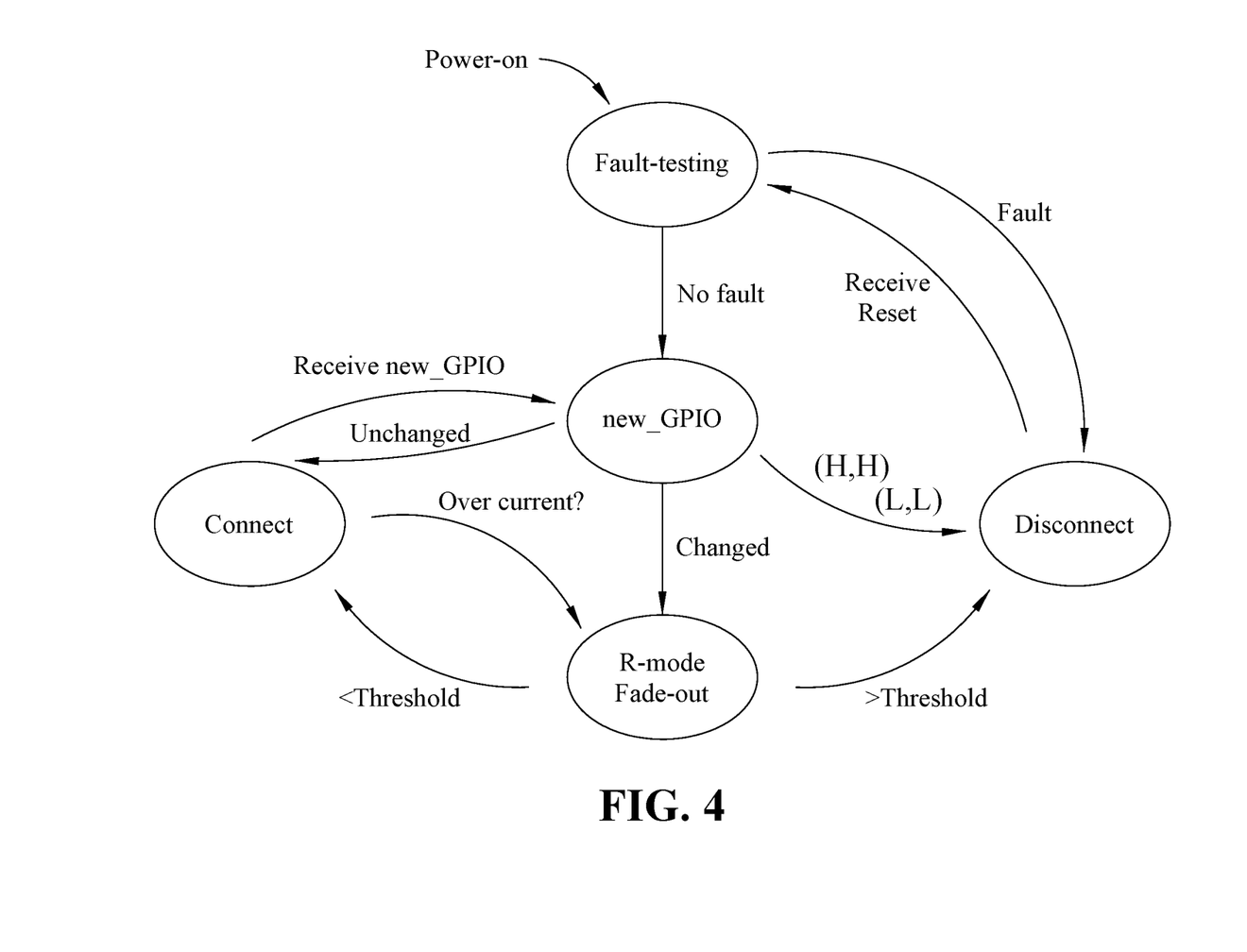
FIG. 4 is a finite state machine (FSM) corresponding to the operation modes of the SPM of the online reconfigurable battery system with SPM according to the present invention.

The following describes the operation modes of the SPM 101 of the present invention in a finite-state machine (FSM) manner. FIG. 4 is a schematic view of the finite state machine corresponding to the operation modes of the SPM 101 according to the present invention. As shown in FIG. 4, the finite state machine of the SPM includes the following five states: fault-testing state (fault-testing), read new GPIO control signal state (new_GPIO), disconnect mode state (disconnect), connect mode state (connect), and resistor mode and then fade out state (R-mode, Fade-out). When the battery system is powered on, the SPM first enters the fault-testing state; when a system error is detected, the SPM enters the disconnect mode (disconnect) until the SPM receives a reset command from the system, and then returns to the fault-testing state; otherwise, as a system error is not detected, the SPM enters the read the new GPIO control signal state (New_GPIO). In the New_GPIO state, if the setting of the received new GPIO control signal is (H, H) or (L, L), the SPM will enter the disconnect mode state until a reset command is received; otherwise, if the new setting of the GPIO control signal is different from the old setting, it enters the resistor mode and then gradually fades out of the resistor mode (R-mode, Fade-out); on the contrary, if the new setting of the GPIO control signal is the same as the old setting, the SPM enters the connect mode state. In the state after the resistor mode is faded out, the current value is measured, and if the current is higher than a current threshold, the disconnect mode state is entered until a reset command is received; otherwise, the connect mode state is entered. In the connect mode state, if an overcurrent condition is detected, that is, a surge current occurs, the SPM will return to the resistor mode again, and then gradually fade out of the resistor mode; on the other hand, if the SPM receives a new GPIO control signal setting command, the SPM enters the state of reading the new GPIO control signal (new_GPIO), and then operates according to the new setting of the received GPIO control signal.

Specifically, the aforementioned new setting command of the GPIO control signal refers to the control setting signal of the third switch S3 and the fourth switch S4 of the SPM; wherein, (H, H) and (L, L) both represent that the third switch S3 and the fourth switch S4 are turned off at the same time.

It is worth noting that when the value of the GPIO control signal is (H, H) or (L, L), both combinations correspond to the mode in which the third switch S3 and the fourth switch S4 are turned off at the same time; on the other hand, the switching between (H, L) and (L, H) corresponds to switching from the resistor mode to the connect mode.

It is worth noting that the reset command and the new setting command of the GPIO control signal are all issued by the control process of the battery system that can be reconfigured in real time, i.e., online. The time when the reconfigurable battery system capable of real-time reconfiguration issues the reset command and the new setting command of the GPIO control signal can be booting, after repairing and replacing the battery, or detecting the need for reconfiguration. In other words, when the online reconfigurable battery system is turned on, repaired and replaced, or is detected to be reconfigured, a reset command can be issued to trigger the SPM in the disconnect mode to return to the fault-testing state and re-examine the faulty condition of the SPM.

On the other hand, the online reconfigurable battery system can also be in the connect mode when the new setting command of the GPIO control signal is issued after the battery is repaired and replaced, or when the reconfiguration is detected. After receiving the new setting command of the GPIO control signal, each SPM enters the disconnect mode, the resistor mode (and then fades out), or stays in the connect mode according to the new setting command of the GPIO control signal.

As such, it can be ensured that each SPM of the present invention can be activated when the battery system is turned on, repaired and replaced, or is detected to be reconfigured, and carry out the necessary surge detection to achieve the effect of protecting the battery module string when the surge occurs.

It should be further explained that the aforementioned so-called resistor mode and then gradually fade out state means that the resistance value of the variable resistor Rv gradually decreases from a first resistance value to a second resistance value within a preset time, for example, in 50 ms from 20Ω to 0.2Ω. By entering the resistor mode and then gradually fading out (that is, reducing the resistance value), the impact of the surge can be buffered.

For example, during the operation, when the battery system needs to be reconfigured at a certain time point T, after issuing a new setting command of the GPIO control signal, each SPM enters the resistor mode and then gradually fades out. When the SPM is gradually reducing the resistance value, for example, after 5 ms, each EBM in each battery module string in the battery system is based on the new settings issued by the battery system. When the resistance value of the variable resistor Rv is reduced to a very small resistance value, it can be determined whether the SPM should enter the connect mode or the disconnect mode according to whether the current exceeds the threshold value.

In summary, the SPM of the present invention can be activated when the online reconfigurable battery system is about to be reconfigured, or when an overcurrent condition is detected, and an activation method is performed to ensure that the SPM can buffer the impact of the instantaneous current surge.

Specifically, the disconnect mode of the SPM of the present invention can be regarded as adding another layer of protection to the disable mode of each EBM to increase the ability and flexibility of partial operation of the battery system. In other words, by disconnecting individual battery module strings or battery modules in a distributed manner, the present invention can more effectively isolate individual faulty battery module strings or battery modules while still providing partial operation of the battery system. For example, if a battery module fails, the battery module string can be disconnected for isolation for maintenance, while other battery module strings can still be used for partial operations. On the other hand, if the battery module or battery module string needs to be hot-plugged, the battery module string and the battery module are isolated to provide double protection.

Figure 5:
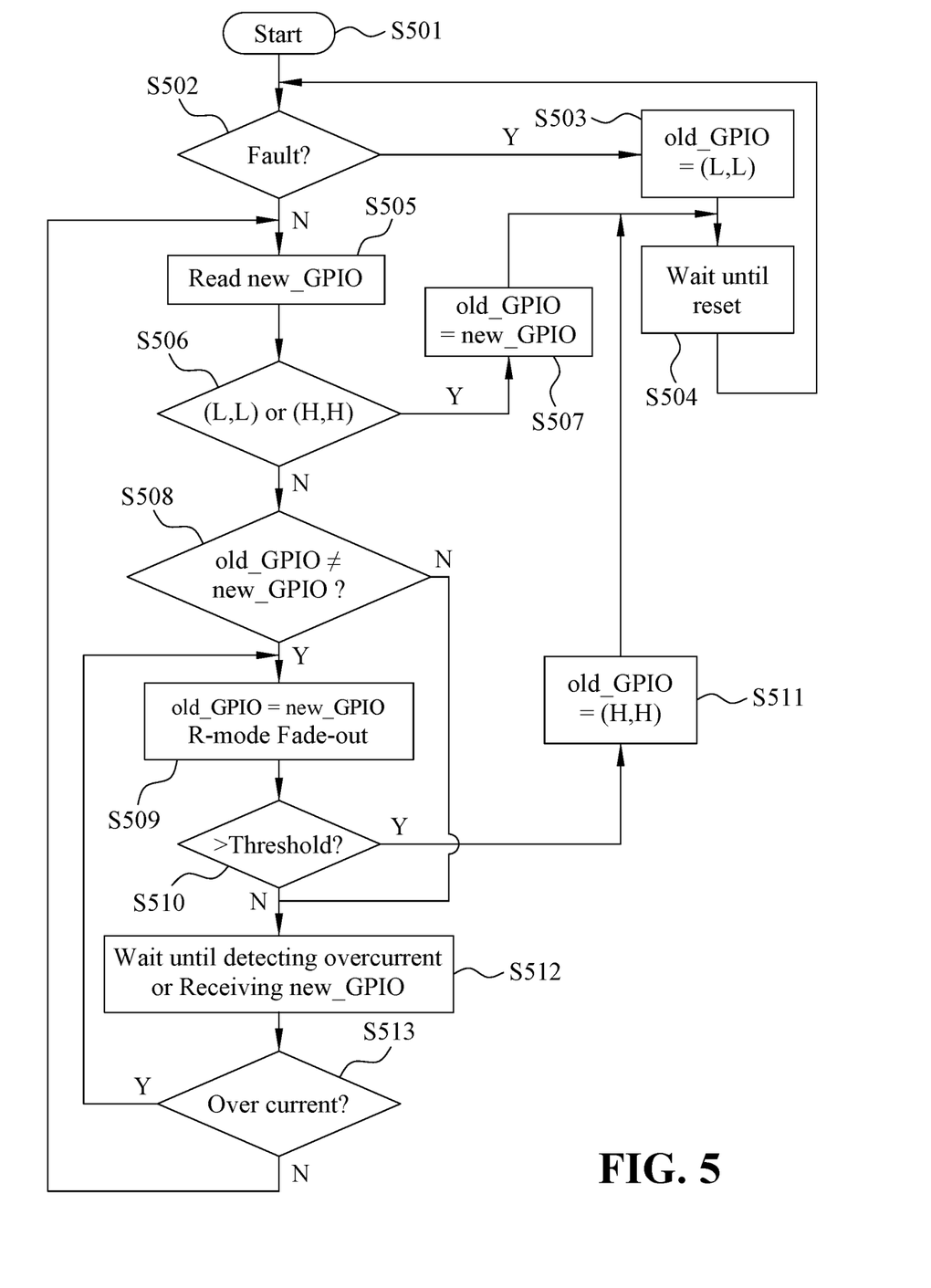
FIG. 5 is a flowchart of the activation method of the SPM according to the present invention.

FIG. 5 shows the corresponding activation method of the SPM of the present invention. As shown in FIG. 5, the activation method includes the following steps:

Step S501: Start the battery system and perform initialization;

Step S502: Check each SPM; if a fault is detected in the SPM, go to step S503; otherwise, go to step S505;

Step S503: Set the old setting (old_GPIO) of the SPM to the third switch and the fourth switch to be off (L, L) at the same time;

Step S504: The SPM enters the disconnect mode until a reset command is received; when the reset command is received, return to step S502;

Step S505: Read a new setting (new_GPIO) command;

Step S506: If the new setting is (H, H) or (L, L), perform step S507;

Step S507: Store the new setting (new_GPIO) into the old setting (old_GPIO); then return to step S504;

Step S508: If the new setting (new_GPIO) is different from the old setting (old_GPIO), go to step S509; otherwise, go to step S512;

Step S509: The new setting (new_GPIO) is stored in the old setting (old_GPIO); the SPM enters the resistor mode, and then gradually fades out of the resistor mode;

Step S510: if the current is higher than a threshold value, go to step S511; otherwise, go to step S512;

Step S511: Set the old setting (old_GPIO) to (H, H); then return to step S504;

Step S512: The SPM enters the connection mode, and then waits until receiving a new setting command (new_GPIO) or detects an overcurrent condition, that is, surge current;

Step S513: If the surge current is detected, return to step S509; otherwise, return to step S505.

Specifically, the fade-out of the resistor mode in step S509 means that the resistance value of the variable resistor Rv gradually decreases from a first resistance value to a second resistance value within a predetermined time. For example, in a preferred embodiment, the predetermined time is in the range of 5 ms-1 s, or preferably, 50 ms; furthermore, the first resistance value and the second resistance value are both greater than the resistance value of the battery module string during normal operation, i.e., connect mode. For example, the first resistance value and the second resistance value are 20Ω and 0.2Ω, respectively.

It is worth noting that the aforementioned overcurrent condition means that when the battery module string is in operation, the current exceeds the threshold; as such, the SPM enters the resistor mode, which is equivalent to receiving a reconfiguration signal from the battery system.

Specifically, the condition for SPM to enter the connect mode from the resistor mode is: in the resistor mode, when the current value is less than the threshold value ($I_{threshold}$); the threshold value can be calculated by the following method: $I_{threshold} = I_{connect-max} * (R_{connect}/R_{R-mode})$, where $I_{connect}$ is the total resistance value of the battery module string in connect mode, and $R_{R-mode}$ is the resistance value of the variable resistor and $R_{connect}$ is the total resistance value of the battery module string in the connect mode, and $I_{connect-max}$ is the maximum allowable current value. The $I_{threshold}$ calculated in this way is the current threshold value for the SPM to enter the connect mode from the resistor mode.

The current threshold value can be between 10 A-1000 A, depending on the application. For example, for electric locomotives, the threshold value can be set to 10 A, while for grid-connected ESS container, the value can be set to 1000 A. In a preferred embodiment, the current threshold is 300 A.

For example, during the transition period of 50 ms reconfiguration, the fading out of the resistor mode of the SPM will change the resistance value from 20Ω to 0.2Ω, both of which are greater than the normal serial resistance (for example, about 45 mΩ). The current decay ratio in resistor mode is between 0.045/20 and 0.045/0.2. At the end of 50 ms, the SPM will determine to disconnect or resume normal connection by comparing its own current (in resistor mode) with the threshold value (67.5 A=300 A*(0.045/0.2)).

In summary, the online reconfigurable battery system with surge protection modules (SPM) of the present invention and the related activation method, by arranging the SPM in series with the battery module string, can be used when the battery system is started or reset, so that the surge is smoothed to prevent the battery module and the battery module string from being impacted and causing short circuit damage.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. An online reconfigurable battery system with surge protection modules, comprising: a plurality of battery module strings connected in parallel;

each battery module string further comprising: a surge protection module (SPM), and a plurality of enable/bypass modules (EBM) connected in series, the plurality of enable/bypass modules connected in series are serially connected to the SPM;

wherein, the EBM further comprising: a battery, a first switch, and a second switch; the first switch and the battery module being connected in series, and then connected in parallel with the second switch to form a battery module with enable or bypass function;

the SPM further comprising: a variable resistor, a third switch, and a fourth switch; the third switch and the variable resistor being connected in series, and then connected in parallel with the fourth switch to control the buffering of the surge current.

2. The online reconfigurable battery system with surge protection modules according to claim 1, wherein the EBM operates in three modes: enable mode, bypass mode, and disable mode; when the first switch is on and the second switch is off, the EBM is in the enable mode, and the battery is in an on state; when the first switch is off and the second switch is on, the EBM is in the bypass mode, and the battery is in an off state; when the first switch is off and the second switch is off, the EBM is in the disable mode, and the EBM is in a disconnected state.

3. The online reconfigurable battery system with surge protection modules according to claim 1, wherein the SPM operate in three modes: resistor mode, connect mode, and disconnect mode; when the third switch is on and the fourth switch is off, the SPM is in the resistor mode, and the current of the SPM will flow through the variable resistor; when the third switch is off and the four switch is on, the SPM is in the connect mode, and the current of the SPM does not flow through the variable resistor; when the third switch is off and the fourth switch is off, the SPM is in the disconnect mode, and no current flows through the SPM.

4. The online reconfigurable battery system with surge protection modules according to claim 3, wherein when the third switch and the fourth switch of the SPM are on at the same time, the SPM is also in the connect mode.

5. An activation method for surge protection modules, applicable to the online reconfigurable battery system with surge protection modules according to claim 3, the activation method comprising the following steps:

Step S501: Start the battery system and perform initialization;

Step S502: Check each SPM; if a fault is detected in the SPM, go to step S503; otherwise, go to step S505;

Step S503: Set the old setting (old_GPIO) of the SPM to the third switch and the fourth switch to be off (L, L) at the same time;

Step S504: The SPM enters the disconnect mode until a reset command is received; when the reset command is received, return to step S502;

Step S505: Read a new setting (new_GPIO) command;

Step S506: If the new setting is (H, H) or (L, L), perform step S507;

Step S507: Store the new setting (new_GPIO) into the old setting (old_GPIO); then return to step S504;

Step S508: If the new setting (new_GPIO) is different from the old setting (old_GPIO), go to step S509; otherwise, go to step S512;

Step S509: The new setting (new_GPIO) is stored in the old setting (old_GPIO); the SPM enters the resistor mode, and then gradually fades out of the resistor mode;

Step S510: if the current is higher than a threshold value, go to step S511; otherwise, go to step S512;

Step S511: Set the old setting (old_GPIO) to (H, H); then return to step S504;

Step S512: The SPM enters the connection mode, and then waits until receiving a new setting command (new_GPIO) or detects an overcurrent condition, that is, surge current;

Step S513: If the surge current is detected, return to step S509; otherwise, return to step S505.

6. The activation method for surge protection modules according to claim 5, wherein the gradual fade-out of the resistor mode in step S509 means that the resistance value of the variable resistance Rv gradually decreases from a first resistance value to a second resistance value within a predetermined time.

7. The activation method for surge protection modules according to claim 6, wherein the first resistance value and the second resistance value are respectively 20 ohm and 0.2 ohm.

8. The activation method for surge protection modules according to claim 6, wherein the predetermined time is 50 ms.

9. The activation method for surge protection modules according to claim 5, wherein the condition for SPM to enter the connect mode from the resistor mode is: in the resistor mode, when the current value is less than the threshold value ($I_{threshold}$), the threshold value can be calculated by the following method: $I_{threshold}=I_{connect-max}*(R_{connect}/R_{R-mode})$, where $R_{connect}$ is the total resistance value of the battery module string in connect mode, and $R_{R-mode}$ is the resistance value of the variable resistor and $R_{connect}$ is the total resistance value of the battery module string in the connect mode, and $I_{connect-max}$ is the maximum allowable current value. The $I_{threshold}$ calculated in this way is the current threshold value for the SPM to enter the connect mode from the resistor mode.

10. The activation method for surge protection modules according to claim 9, wherein the current threshold is 300 A.

* * * * *